(12) United States Patent
Margulis

(10) Patent No.: US 7,877,690 B2
(45) Date of Patent: Jan. 25, 2011

(54) MEDIA SYSTEM WITH INTEGRATED CLIP VIEWS

(75) Inventor: Vlad Margulis, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 59 days.

(21) Appl. No.: 11/533,738

(22) Filed: Sep. 20, 2006

(65) Prior Publication Data

US 2008/0077866 A1    Mar. 27, 2008

(51) Int. Cl.
 G06F 3/00 (2006.01)
 H04N 7/16 (2006.01)
(52) U.S. Cl. .......................... 715/723; 725/41
(58) Field of Classification Search ................ 715/723; 725/41
See application file for complete search history.

(56) References Cited

U.S. PATENT DOCUMENTS

| | | | | |
|---|---|---|---|---|
| 5,999,173 | A * | 12/1999 | Ubillos | 715/724 |
| 6,298,613 | B1 | 10/2001 | Coulton et al. | |
| 6,628,303 | B1 * | 9/2003 | Foreman et al. | 715/723 |
| 6,928,613 | B1 * | 8/2005 | Ishii et al. | 715/726 |
| 7,173,623 | B2 * | 2/2007 | Calkins et al. | 345/473 |
| 7,325,199 | B1 * | 1/2008 | Reid | 715/723 |
| 7,478,327 | B1 * | 1/2009 | Reid | 715/723 |
| 2007/0200853 | A1 * | 8/2007 | Bruggeman | 345/473 |

OTHER PUBLICATIONS

Avid Pinnacle Studio Plus 10, release date Sep. 15, 2005, CNET Review, 7 Slides. Troy Dreier, 7 Slides listed as separate pages as 11533738_1avidpinnacle pdf file-11533738_7avidpinnacle pdf file.*
RealPlayer 7 Plus Manual, Chapter 7, Jan. 27, 2005. pp. 59-77.*
Studio Plus Version 10, User Guide, 4 FIGS. 3 Pages, release date Sep. 15, 2005.*
Adobe Premiere 6.0, Review Date: Apr. 30, 2001, Erik Holsinger.*
Lisa Brenneis, Final Cut Pro HD for Mac OS X: Visual Quickpro Guide, Jul. 2004, Ch. 2, Ch. 8: Working with Clips in the Viewer, Ch. 9: Performing Edits in the Timeline, Basic Edit, Basic Edit Step by Step, Shortcut for Marking Edit Sequences, Using many FCPs, and Ch. 10: Editing in Timeline.*

(Continued)

*Primary Examiner*—William L Bashore
*Assistant Examiner*—David Phantana-angkool
(74) *Attorney, Agent, or Firm*—Fish & Richardson P.C.

(57) ABSTRACT

Techniques are provided for presenting time data for audio and video clips. Operations for a data processing apparatus include obtaining video data, including multiple video clips, and presenting the video data in a user interface. The user interface can include a video display element to play video, a clip selection element to receive video clip selections, and a timeline element to present both chronological and durational information about the video clips on a defined time scale. The operations can include receiving a selection of one of the video clips through the clip selection element, and adjusting, in response to the selection, the defined time scale in the timeline element based on the one of the video clips selected. A view of a video clip can be replaced by the selected video clip, and the timeline element can be updated to present corresponding durational information within the defined time scale.

54 Claims, 4 Drawing Sheets

OTHER PUBLICATIONS iLife '06, "iMove HD6," Copyright 2006 Apple Computer, Inc., 4 pages.
Final Cut Studio Cut to the Future, "Motion 2. Advanced animation. Instant gratification.", http://www.apple.com/finalcutstudio/motion/, Copyright 2005 Apple Computer, Inc, 4 pages.

CNET Slide Show: "Avid Pinnacle Studio Plus 10", Sep. 15, 2005, 19 pages.
International Search Report, Application Serial No. PCT/US07/79057, Jul. 7, 2008, 32 pages.

* cited by examiner

MEDIA SYSTEM WITH INTEGRATED CLIP VIEWS

BACKGROUND

The present disclosure relates to the presentation of video in a graphical user interface (GUI).

Software, such as Adobe® Premiere® software by Adobe Systems Incorporated of San Jose, Calif., USA, can be used to store and arrange video clips. Premiere® software can store multiple video clips on multiple video segments and can facilitate the management of playing video from the video segments using various video content and multiple video sources. The video clips can be arranged in the software to play back video with multiple scenes from the video clips. The software can allow the clips to be arranged in a non-sequential order and can facilitate the use of personalized graphics, text, and visual effects to appear in the video during play back.

SUMMARY

This specification describes technologies relating to the presentation of media, such as video and audio, in a graphical user interface. In general, one aspect of the subject matter described in this specification can be embodied in a system that includes a graphical user interface configured to play and edit video. The graphical user interface (GUI) includes a video segment user interface element configured to play a video segment, where the video segment includes multiple, selectable video clips. The GUI includes a video clip user interface element configured to present a chronological representation of the multiple, selectable video clips, and a timeline configured to present timing data associated with the video segment. The system also includes a time scaler configured to scale a representation of the timing data associated with a selected video clip to present in a defined time scale in the timeline.

These and other embodiments can optionally include one or more of the following features. The chronological representation can have thumbnail representations of the multiple, selectable video clips. The timeline can be configured to present chronological and durational information about the multiple, selectable video clips on the defined time scale. The system can be configured to select a most recently-played video clip for the selected video clip. The GUI can be configured to concurrently present the selected video clip presented in the video segment user interface element and a chronological representation of at least one of the multiple, selectable video clips that is chronologically adjacent to the selected video clip.

The GUI can have a control panel for video playback, where the control panel can include controls for playing, stopping, pausing, fast forwarding, rewinding, and skipping video. The GUI can have a media bin panel that can include video data for playing in the video segment user interface element, where the video data in the media bin panel can include still images, moving images, video clips, and video segments. The GUI can include a properties panel to present properties for media selected from the media bin panel, in which the properties panel can have image controls, motion controls, opacity property controls, and volume controls. The GUI can be configured to present animation of the scaling of the representation of the timing data associated with the selected video clip. The time scaler can be configured to scale a representation of the timing data associated with a selected video clip when a video segment ceases playing in the video segment user interface element.

In general, another aspect of the subject matter described in this specification can be embodied in a computer program product, encoded on a computer-readable medium, operable to cause data processing apparatus to perform operations that include obtaining video data that includes multiple video clips. The operations include presenting the video data in a user interface that includes a video display element configured to play video from the video data, a clip selection element configured to receive selections of the video clips, and a timeline element configured to present both chronological and durational information about the video clips on a defined time scale. The operations also include receiving a selection of one of the video clips through the clip selection element, and adjusting, in response to the selection, the defined time scale in the timeline element based on the one of the video clips selected.

These and other embodiments can optionally include one or more of the following features. The operations can involve presenting animation in the timeline element to indicate the adjusting of the defined time scale. The selection of one of the video clips can involve detecting when video data in the user interface stops playing, and selecting a most recently-played video clip for the adjusting of the defined time scale. The selection of one of the video clips can involve a selection from a video clip user interface element that can be configured to present a chronological representation of video clips in the video data.

In general, another aspect of the subject matter described in this specification can be embodied in a method for presenting video data that includes obtaining video data that includes multiple video clips. The method includes presenting the video data in a user interface that includes a video display element configured to play video from the video data, a clip selection element configured to receive selections of the video clips, and a timeline element configured to present both chronological and durational information about the video clips on a defined time scale. The method includes receiving a selection of one of the video clips through the clip selection element, and adjusting, in response to the selection, the defined time scale in the timeline element based on the one of the video clips selected.

These and other embodiments can optionally include one or more of the following features. The method can involve presenting animation in the timeline element to indicate the adjusting of the defined time scale. The selection of one of the video clips can include a selection from a video clip user interface element configured to present a chronological representation of video clips in the video data. The selection of one of the video clips can involve detecting when video data in the user interface stops playing and selecting a most recently-played video clip for the adjusting of the defined time scale. The method can also involve detecting an initiation to play the video data, presenting the video data in the video display element, and presenting durational information for the video data in the timeline element. The method can also involve presenting a chronological representation of the multiple video clips that are chronologically adjacent to the selected video clip.

In general, another aspect of the subject matter described in this specification can be embodied in a computer program product, encoded on a computer-readable medium, operable to cause data processing apparatus to perform operations that include receiving a selection of a video clip to present in a video segment user interface element, where the video segment user interface element is configured to play a video segment that includes multiple video clips. The operations involve adjusting a representation of a time duration associated with the video clip according to a defined time scale, presenting the representation of the time duration associated with the video clip in the timeline, and presenting the video clip in the video segment user interface element.

These and other embodiments can optionally include one or more of the following features. The operations can also include presenting a chronological representation of multiple video clips that are chronologically adjacent to the video clip. The presentation can involve presenting the chronological representation of the multiple video clips that are chronologically adjacent to the video clip when the video clip is selected for presentation in the video segment user interface element. The operations can include animating the adjusting of the representation of the time duration. The operations can also involve detecting when the video segment stops playing and triggering the selection of the video clip to present in the video segment user interface. The operations can also include detecting an initiation to play the video segment, presenting the video segment in the video segment user interface element, and presenting a representation of the time duration of the video segment in the timeline.

In general, another aspect of the subject matter described in this specification can be embodied in a computer program product, encoded on a computer-readable medium, operable to cause data processing apparatus to perform operations that include obtaining audio data that includes multiple audio clips. The operations include presenting the audio data in a user interface that includes an audio display element configured to present a representation of audio from the audio data to play the audio, a clip selection element configured to receive selections of the audio clips, and a timeline element configured to present both chronological and durational information about the audio clips on a defined time scale. The operations include receiving a selection of one of the audio clips through the clip selection element, and adjusting, in response to the selection, the defined time scale in the timeline element based on the one of the audio clips selected. The operations also include presenting animation in the timeline element to indicate the adjusting of the defined time scale.

These and other embodiments can optionally include one or more of the following features. The selection of one of the audio clips can involve detecting when audio data in the user interface stops playing, and selecting a most recently-played audio clip for the adjusting of the defined time scale. The selection of one of the audio clips can involve a selection from an audio clip user interface element configured to present a chronological representation of audio clips in the audio data.

Particular embodiments of the invention can be implemented to realize one or more of the following advantages. A user of the GUI system can view video and temporal information for a video clip and a video segment (e.g., a movie) using a common timeline. A user need not switch manually between two modes, to view video clips in a video clip mode and view a video segment in a video segment mode. Since a user can view a video segment and related clips in the same graphical user interface, user confusion can be reduced because the user need not keep track of the mode for the type of video, e.g., video clips or video segments, in the GUI.

The scaling of the time displayed in the timeline can allow the user to see a total amount of time in the video clip and the remaining amount of time in the clip, regardless of the duration of the video clip. Regardless of whether a video clip is five minutes in duration or fifty seconds in duration, the video system can show a representation of the duration of the video clip that fills a defined scale within the timeline. In some embodiments, if a user selects an individual video clip of one time duration to present in the GUI and subsequently selects a video clip with another time duration, the video system can adjust the time scale for the timeline from one selected video clip to the next.

When a video segment, such as a movie, plays video in the GUI, the GUI can show representations of multiple clips in the same GUI as the playing video segment. The multiple video clips can be the video clips that are part of the video segment. In some embodiments, the representations of the multiple clips can be thumbnails of the video clips. In other embodiments, the GUI can show the currently playing clip, as well as chronologically adjacent video clips, such as a previous video clip that most recently played and a successive video that is in line to play after the current video clip finishes playing in the GUI. In some embodiments, the video segment can play in the GUI and representations of multiple video clips from the video segment can be shown in the GUI simultaneously, where the representations of the video clips can be chronologically adjacent to the video clip that is currently playing in the GUI as part of the video segment. In other embodiments, when the video segment stops playing, the representation of the duration of the most-recently played video clip can be resized in the timeline to fill in a defined amount of viewing space within the visible boundaries of the timeline in a defined time scale. The resizing of the duration of the video clip in the timeline can be animated to show a user that the timeline view is transitioning to the scaled view of the duration of the video clip. Thus, a GUI user can keep within the wider context of the video segment playing in the GUI while being presented with views of the currently playing video clip and the chronologically adjacent video clips.

In some embodiments, the timeline can show the duration of the video segment when the video segment is playing, and the timeline can show the duration of the most-recently played video clip when the video segment is stopped. When the video segment is stopped, the last frame of the video clip can be shown in the GUI, and the timeline can show the scaled amount of time for the video clip and the duration of the video clip. A user can view the scaled amount of time for the video clip, view the properties of the video clip, and make edits to the video clip. In some embodiments, individual clips can be selected from the GUI, and the timeline can automatically show a scaled representation of the duration of each video clip that is selected to play in the GUI. In some embodiments, selecting a clip to play in the GUI can set the timeline to show the duration of the video segment and can start the playing of the video segment from the point in the video segment where the video clip was selected to play.

As an advantage, a user does not have to manually adjust the view of the duration of each video clip in the timeline to compensate for the varying time durations among various clips. In another advantage, a single timeline can be used to show the duration of the video segment when the video segment is playing, as well as show the duration of the video clip within the video segment when the video segment is not playing.

The details of one or more embodiments of the disclosure are set forth in the accompanying drawings and the description below. Other features, aspects, and advantages of the disclosure will become apparent from the description, the drawings, and the claims.

BRIEF DESCRIPTION OF THE DRAWINGS

FIGS. 3A-4A show flowcharts with examples of timeline scaling techniques.

Like reference numbers and designations in the various drawings indicate like elements.

DETAILED DESCRIPTION

Figure 1:
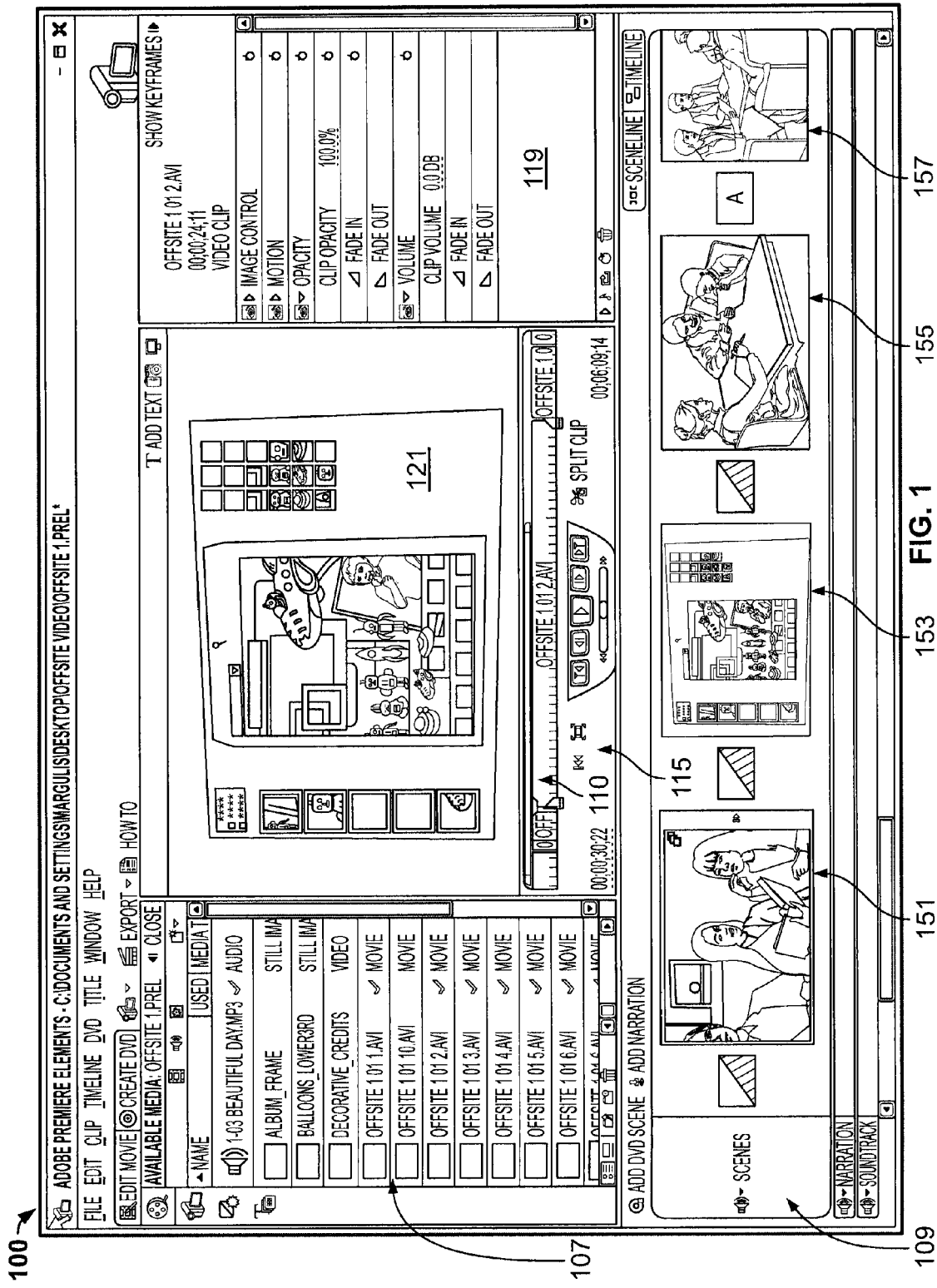
FIG. 1 shows an example of a graphical user interface (GUI) for the presentation of video.

FIG. 1 shows an example of a graphical user interface (GUI) 100 for an example video system. The GUI 100 can play video segments in a video segment user interface element 121. The video segment can include video footage, movies, video tracks, and moving and still images. The video segment can also include multiple video clips. The GUI 100 includes controls for video playback in a control panel 115, where the video playback controls can include stopping, pausing, fast forwarding, rewinding, and skipping. A media bin panel 107 includes references to video data for playing in the video segment user interface element 121. The video data represented in the media bin panel 107 can include video data, such as video segments and video clips. The GUI 100 includes a properties panel 119 to show properties for selected media from the media bin panel 107. The properties in the properties panel 119 can include image controls, motion controls, opacity properties, and volume.

The video segment in the video segment user interface element 121 includes multiple video clips in a video clip storyboard 109 in the GUI 100. The video clip storyboard 109 shows multiple video clips 151, 153, 155, 157 that are arranged in a chronological order as arranged in the video segment. In some embodiments, the video clip storyboard 109 presents visual representations of video clips 151, 153, 155, 157 by presenting a snapshot or frame of the video clips 151, 153, 155, 157 in a thumbnail image to identify each clip to the GUI user. In some embodiments, the video clip that currently plays in the video segment user interface element 121 is presented in the video clip storyboard 109.

The GUI 100 includes a timeline 110 that can present a representation of the duration of the video segment or a video clip in the video segment. The timeline can also show a remaining time of video for the video segment or the video clip. The timeline can also show an indication of how much time has elapsed from the video for the video segment of the video clip. In some embodiments, the timeline can have an elapsed time indicator to show how much time has been played in the video segment or video clip. In some embodiments, when a video segment is selected to play in the video segment user interface element 121, the timeline can show a representation of the duration of the video segment in the timeline. In other embodiments, when an end of a video segment is reached or when the control panel 115 receives a command to stop or pause video from playing, the timeline can show a representation of an amount of time associated with the last video clip that played in the video segment user interface element 121. The timeline can automatically scale the representation of the duration of the video clip to fit within the boundaries of the timeline 110 in a defined time scale.

For example, if the video segment stopped playing on video clip 151 and video clip 151, has a duration of two minutes, then the full two-minute duration of the video clip can be presented within the boundaries of the timeline 110 in the defined time scale. If the video segment stopped playing on video clip 153 and video clip 153 has a duration of ten minutes, for example, then the duration of the video clip can be presented within the boundaries of the timeline 110 at approximately the same visual length in the timeline 110 as the duration for video clip 151. In another example, if the video clip 155 has a duration of twenty seconds and the video segment stopped playing on video clip 155, then the duration of the video clip would be presented within the boundaries of the timeline 110 at approximately the same visual length in the timeline as video clips 151 and 153, even though the duration for video clip 155 is much less than video clips 151 and 153. Thus, the timescale for video clip 151 can be two minutes per inch of the user interface screen space in the timeline 110, video clip 153 can be five minutes per inch of the user interface screen space in the timeline 110, and video clip 155 can be ten seconds per inch of the user interface screen space in the timeline 110. The actual scaling of the video clip in the timeline 110 can be animated to show and notify the user that the duration of the video clip is scaled in the timeline to a defined time scale. For example, a transition from five minutes per inch to ten seconds per inch can be animated.

Figure 2:
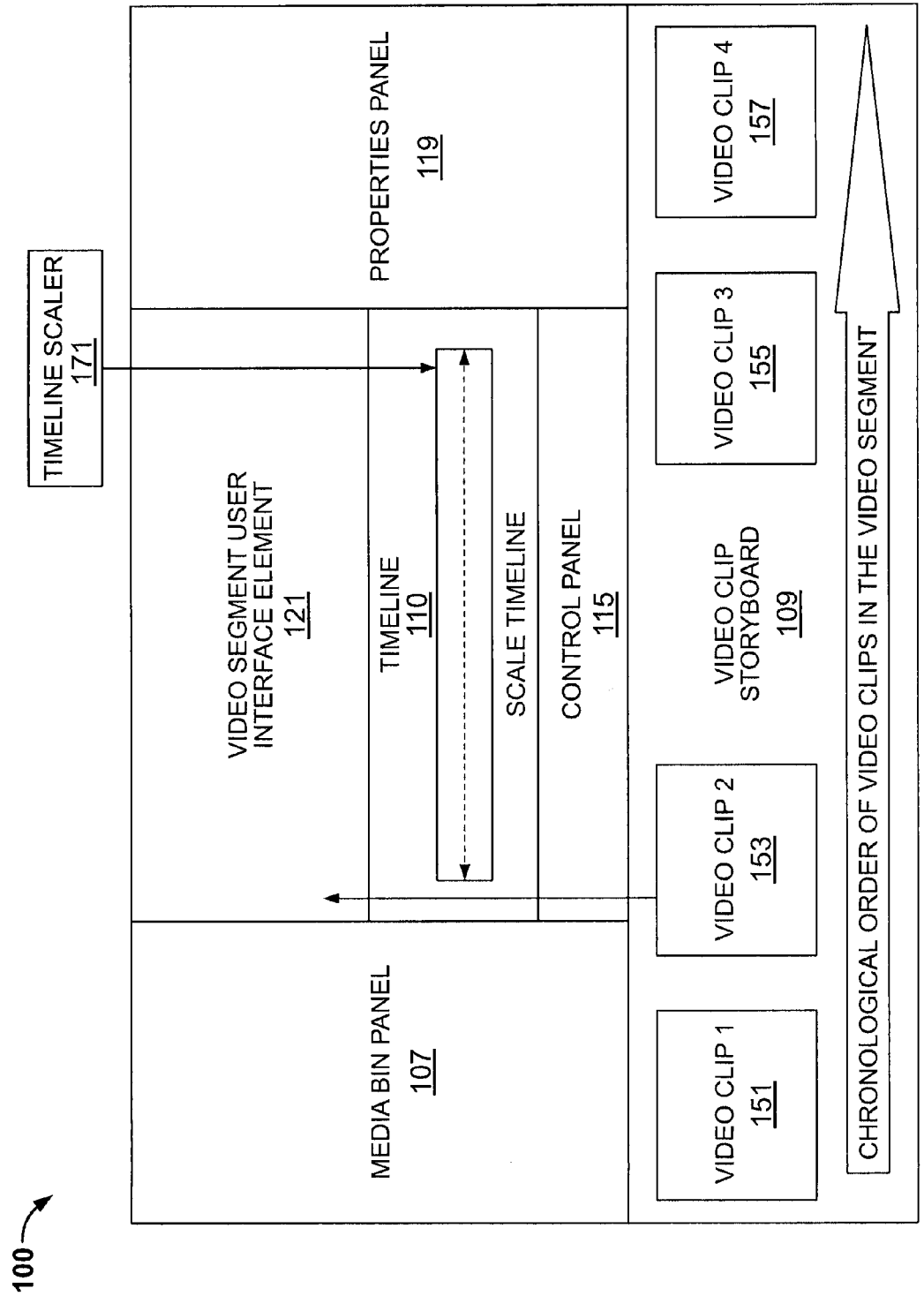
FIG. 2 shows an example of a GUI for the presentation of video.

FIG. 2 shows an example of the GUI 100 for presenting the video. As in FIG. 1, the GUI 100 includes a media bin panel 107 and a video clip storyboard 109 for video clips 151, 153, 155, 157 in a video segment. The video clips 151, 153, 155, 157 are arranged to present a chronological order of the video clips in the video segment. The GUI 100 includes a video segment user interface element 121 to present the video from the video segment, a timeline 110 to present temporal properties, and a control panel 115 for video playback.

A time scaler 171 can be used to scale a representation of the time of the video clips within the timeline 110. In some embodiments, the time scaler 171 can be implemented in software to show an appropriate visual scale to fit within a defined length of the timeline 110 in a defined time scale. The timeline 110 can be resized to different visual dimensions within the GUI 100, and the defined time scale can adjust the displayed time data such that the full time data is displayed for video clip in the timeline for varying timeline dimensions.

In one example of the operation of the scaling of a video clip, video clip 153 can be selected by a user to play in the video segment user interface element 121. The video clip 153 can have associated timing data to show a duration of the video clip 153. As the video clip is inserted into the video segment user interface element 121, the timeline scaler 171 can use the timing data associated with the video clip 153 and can determine a time scale to fit within the visual boundaries of the timeline 110. As the video clip begins to play in the GUI element 121, the main GUI 100 can present animation to show a short-length video clip being stretched into the timeline 110 or a long-length video clip being compressed to fit within the timeline 110.

Figure 3A:
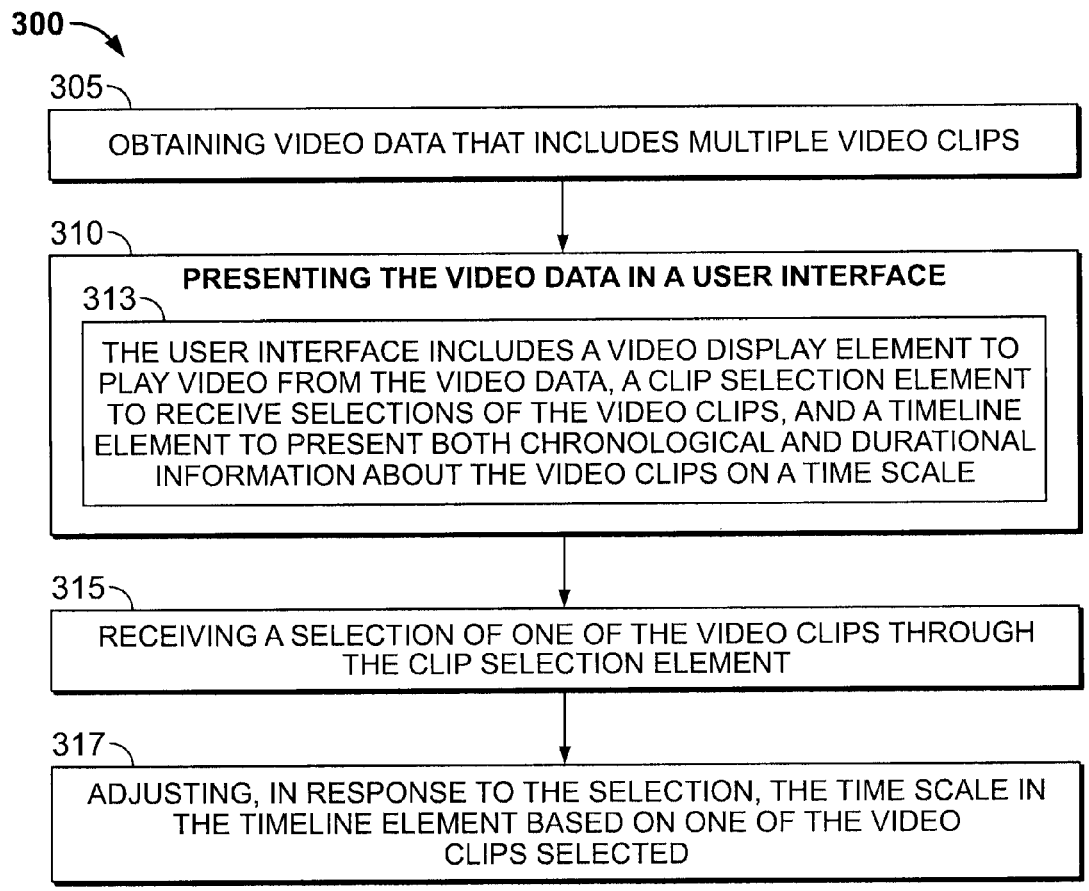

FIG. 3A shows a flowchart 300 of an example timeline scaling technique. Video data are obtained that include multiple video clips at 305. The video data are presented in a user interface at 310. The user interface includes a video display element to play video from the video data, a clip selection element to receive selections of the video clips, and a timeline element to present both chronological and durational information about the video clips on a time scale. In the embodiments described in connection with FIGS. 1-2, for example, the video data can be obtained from a media bin panel 107 to present the video data in the video segment user interface element 121. The timeline scaling technique can include receiving a selection of one of the video clips through a clip selection element at 315. In some embodiments, the selection of the video clip can be triggered by a selection element, such as a mouse or a keypad. In other embodiments, the selection of the video clip can be automatically triggered by stopping the playback of the video data, where the video clip that is selected can be the most-recently played video clip in the video data or a previously played video clip. The technique involves adjusting, in response to the selection, the time scale in the timeline element at 317 based on one of the video clips selected.

Figure 3B:
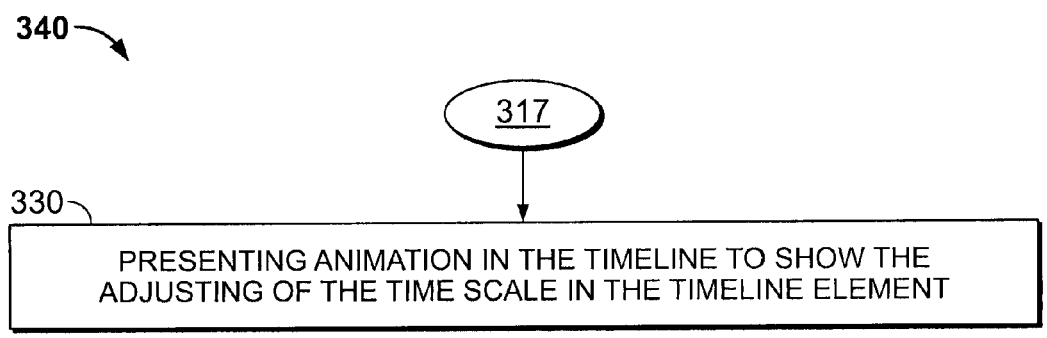

FIG. 3B shows a flowchart 340 where the time scaling technique involves presenting animation in the timeline at 330 to show the scaling of the time scale in the timeline element to a user of the user interface. The animation can let the user know that the selected video clip at 317 has a time duration that is adjusted to fit the time scale in the timeline element. By showing the animation of the scaling of the time duration of the video clip fully in the timeline element, the video time scaling technique can present a user with an easily-viewable time scale of the time duration of the video clip in the timeline, regardless of the duration of the video clip. After the video clip is shown in the user interface and the time scale has been adjusted in the timeline, the user may subsequently modify the video clip and perform edits to the video clip, according to example implementations.

Figure 4A:
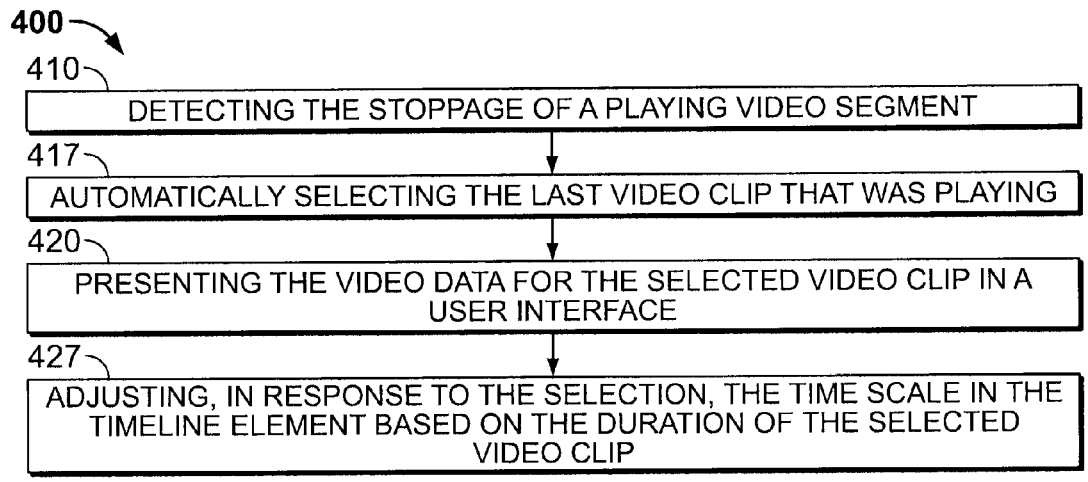

A single timeline can be used to show the duration of the video segment when the video segment is playing, as well as show the duration of the video clip within the video segment when the video segment is not playing. FIG. 4A shows a flowchart for adjusting the time scale of the video clip in the timeline when the video segment stops playing, and FIG. 4B shows a flowchart for the timeline operation when the video segment is playing.

In the flowchart 400 of FIG. 4A, a stoppage of a playing video segment is detected at 410. The last video clip that played in the video segment is automatically selected at 417, and video data from the selected video clip is presented in the user interface at 420. In some embodiments, the video data presented in the user interface can be a still image or snapshot of the last frame of the video clip before the playback was stopped for the video segment. In other embodiments, the video data can be a represenation of the video clip, such as an icon, or the first frame of the video clip. In response to the automatic selection, the time scale is adjusted to scale the timeline element at 427 based on the duration of the selected video clip to show fully the duration of the clip within the visual boundaries of the timeline element in a defined time scale.

Figure 4B:
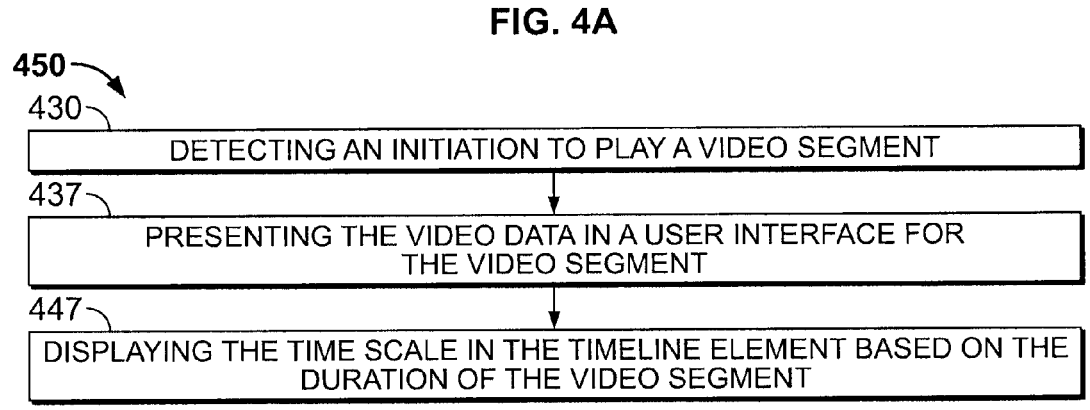
FIG. 4B is a flowchart showing an example of a video playing technique.

FIG. 4B shows a flowchart 450 of another operation of the timeline element when the video segment is playing. An initiation to play the video segment is detected at 430. The video data is presented in the user interface for the video segment at 437. The time scale associated with the video segment is presented in the timeline element based on the duration of the video segment at 447.

In some embodiments, audio content can be used in FIGS. 1-2, such as audio content selected from the media bin panel 107. For example, the timeline can have a time scale that can be adjusted for various audio contents, in which an audio segment can include multiple, selectable audio clips, and an audio clip can be selected from an audio segment.

Figure 5:
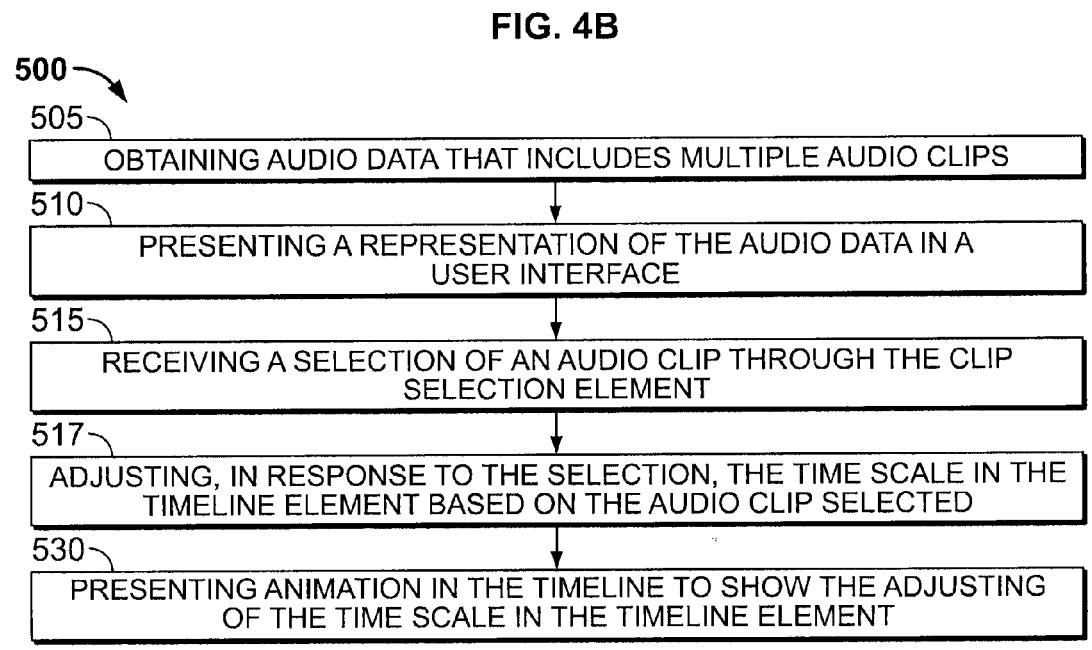
FIG. 5 shows a flowchart with an example for audio data.

FIG. 5 shows a flowchart with an example for audio data. Audio data are obtained that include multiple audio clips at 505. A representation of the audio data are presented in a user interface at 510. The representation can include a photograph or image, such as an album cover, as well as other information, such as an artist, songwriter, speaker, event, or album. The representation of the audio data may also include audio waveforms and moving images. The user interface includes an audio display element to present the representation of audio from the audio data, a clip selection element to receive selections of the audio clips, and a timeline element to present both chronological and durational information about the audio clips on a time scale. The timeline scaling technique can include receiving a selection of one of the audio clips through a clip selection element at 515. In some embodiments, the selection of the audio clip can be triggered by a selection element, such as a mouse or a keypad. In other embodiments, the selection of the audio clip can be automatically triggered by stopping the playback of the audio data, where the audio clip that is selected can be the most-recently played audio clip in the audio data or a previously-played audio clip. The technique involves adjusting, in response to the selection, the time scale in the timeline element at 517 based on one of the audio clips selected. The time scaling technique involves presenting animation in the timeline at 530 to show the scaling of the time scale in the timeline element to a user of the user interface. The animation can let the user know that the selected audio clip at 517 has a time duration that is adjusted to fit the time scale in the timeline element. By showing the animation of the scaling of the time duration of the audio clip fully in the timeline element, the audio time scaling technique can present a user with an easily-viewable time scale of the time duration of the audio clip in the timeline, regardless of the duration of the audio clip. After the audio clip is shown in the user interface and the time scale has been adjusted in the timeline, the user may subsequently modify the audio clip and perform edits to the audio clip, according to example implementations.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. For example, the arrangement of the elements in the GUI of FIGS. 1-2 can vary from the arrangement shown. In some embodiments, any image in the previous video clip that played in the video segment can be randomly selected at 417, and that selected image can be presented in the GUI at 420.

What is claimed is:

1. A system comprising:
    a processor to process video;
    a memory to store the video;
    a graphical user interface configured to play and edit the video, the graphical user interface comprising:
        a video segment user interface element configured to play a video segment, wherein the video segment comprises a plurality of selectable video clips;
        a video clip user interface element configured to present a chronological representation of the plurality of selectable video clips; and
        a timeline configured to present timing data associated with the video segment; and
    a time scaler configured to remove a representation of the timing data associated with the video segment or timing data for a displayed video clip in the timeline, and scale a representation of timing data associated with a selected video clip, wherein the graphical user interface is configured to present the representation of the timing data associated with the selected video clip within a defined time scale in the timeline, and wherein the system is configured to animate the removal of the representation of the timing data associated with the video segment or timing data for the displayed video clip in the timeline, and animate the scaling of the representation of timing data associated with the selected video clip.

2. The system in accordance with claim 1, wherein the chronological representation comprises thumbnail representations of the plurality of selectable video clips.

3. The system in accordance with claim 1, wherein the timeline is further configured to present chronological and durational information about the plurality of selectable video clips on the defined time scale.

4. The system in accordance with claim 1, wherein the system is configured to select a most recently-played video clip for the selected video clip.

5. The system in accordance with claim 1, wherein the graphical user interface is configured to concurrently present the selected video clip presented in the video segment user interface element and a chronological representation of at least one of the plurality of selectable video clips that is chronologically adjacent to the selected video clip.

6. The system in accordance with claim 1, wherein the graphical user interface further comprises a control panel for video playback, wherein the control panel comprises controls for playing, stopping, pausing, fast forwarding, rewinding, and skipping video.

7. The system in accordance with claim 1, wherein the graphical user interface further comprises a media bin panel comprising video data for playing in the video segment user interface element, wherein the video data in the media bin panel comprises still images, moving images, video clips, and video segments.

8. The system in accordance with claim 7, wherein the graphical user interface further comprises a properties panel to present properties for media selected from the media bin panel, wherein the properties panel comprises image controls, motion controls, opacity property controls, and volume controls.

9. The system in accordance with claim 1, wherein the system is configured to: detect when the animation of the removal and scaling has been completed; and upon detecting that the animation of the removal and scaling has been completed, present the representation of the timing data associated with the selected video clip within the defined time scale in the timeline at a location that is underneath the selected video clip.

10. The system in accordance with claim 1, wherein the time scaler is further configured to scale a representation of the timing data associated with a selected video clip when a video segment ceases playing in the video segment user interface element.

11. A computer program product, encoded on a computer-readable medium, operable to cause data processing apparatus to perform operations comprising:

obtaining video data comprising a plurality of video clips;

presenting the video data in a user interface comprising a video display element configured to play video from the video data, a clip selection element configured to receive selections of the video clips, and a timeline element configured to present both chronological and durational information about a first video clip on a defined time scale;

receiving a selection for a second video clip from one of the video clips through the clip selection element;

adjusting, in response to the selection, the defined time scale in the timeline element based on durational information of the second video clip; and presenting the adjusted defined time scale corresponding to the durational information of the second video clip in the timeline element, wherein an animation is used in the timeline element for presenting the adjusted defined time scale corresponding to the durational information of the second video clip in the timeline element.

12. The computer program product in accordance with claim 11, the operations further comprising:

determining a duration of the first video clip and a duration of the second video clip; and comparing the duration of the first video clip and the duration of the second video clip, wherein if the duration of the first video clip is less than the duration of the second video clip, the animation illustrates a stretching of the durational information of the first video clip to the durational information of the second video clip to illustrate that the duration of the second video clip is longer than the duration of the first video clip, and wherein if the duration of the first video clip is greater than the duration of the second video clip, the animation illustrates a compression of the durational information of the first video clip to the durational information of the second video clip to illustrate that the duration of the second video clip is shorter than the duration of the first video clip.

13. The computer program product in accordance with claim 11, wherein the selection of one of the video clips comprises:

detecting when video data in the user interface stops playing; and selecting a most recently-played video clip for the adjusting of the defined time scale.

14. The computer program product in accordance with claim 11, wherein the selection of the second video clip comprises a selection from a video clip user interface element configured to present a chronological representation of video clips in the video data.

15. A method for presenting video data comprising:

obtaining video data comprising plurality of video clips;

presenting the video data for a first video clip in a user interface comprising a video display element configured to play video from the video data, a clip selection element configured to receive selections of the plurality of video clips, and a timeline element configured to present both chronological and durational information for the first video clip or a video segment on a defined time scale;

receiving a selection for a second video clip from one of the plurality of video clips through the clip selection element;

adjusting, in response to the selection, the defined time scale in the timeline element based on durational information of the second video clip; and presenting the adjusted defined time scale corresponding to the durational information of the second video clip in the timeline element, wherein an animation is used in the timeline element for presenting the adjusted defined time scale corresponding to the durational information of the second video clip in the timeline element.

16. The method in accordance with claim 15, further comprising presenting determining a duration of the first video clip and a duration of the second video clip; and comparing the duration of the first video clip and the duration of the second video clip, wherein if the duration of the first video clip is less than the duration of the second video clip, the animation illustrates a stretching of the durational information of the first video clip to the durational information of the second video clip to illustrate that the duration of the second video clip is longer than the duration of the first video clip, and wherein if the duration of the first video clip is greater than the duration of the second video clip, the animation illustrates a compression of the durational information of the first video clip to the durational information of the second video clip to illustrate that the duration of the second video clip is shorter than the duration of the first video clip.

17. The method in accordance with claim 15, wherein the selection of one of the plurality of video clips comprises a selection from a video clip user interface element configured to present a chronological representation of video clips in the video data.

18. The method in accordance with claim 15, wherein the selection of one of the plurality of video clips comprises:
detecting when video data in the user interface stops playing; and
selecting a most recently-played video clip for the second video clip.

19. The method in accordance with claim 18, further comprising:
detecting an initiation to play the video data;
presenting the video data in the video display element; and
presenting the durational information for the video data in the timeline element.

20. The method in accordance with claim 15, further comprising presenting a chronological representation of the plurality of video clips that are chronologically adjacent to the one of the video clips selected.

21. A computer program product, encoded on a computer-readable medium, operable to cause data processing apparatus to perform operations comprising:
presenting a video segment or a first video clip of the video segment in a video segment user interface element, wherein the video segment comprises one of a plurality of video clips, wherein the video segment user interface element is configured to play the video segment or one of the plurality of video clips from the video segment;
presenting a first representation of a first time duration in a timeline corresponding to the video segment or the first video clip;
receiving a selection of a second video clip from the plurality of video clips to present in the video segment user interface element;
replacing the first representation of the first time duration in the timeline with a second representation of a second time duration corresponding to the second video clip, wherein the replacing comprises adjusting the first representation to the second time duration in a defined time scale in the timeline;
presenting the second representation associated with the second video clip in the timeline by animating the adjusting of the first representation to the second time duration; and
presenting the second video clip in the video segment user interface element.

22. The computer program product in accordance with claim 21, the operations further comprising:
presenting a chronological representation of a plurality of video clips that are chronologically adjacent to the video clip.

23. The computer program product in accordance with claim 22, wherein the presenting the chronological representation of the plurality of video clips comprises presenting the chronological representation of the plurality of video clips that are chronologically adjacent to the video clip when the video clip is selected for presentation in the video segment user interface element.

24. The computer program product in accordance with claim 21, wherein the animating of the adjusting of the first representation to the second time duration comprises operations for providing the animation by stretching or compressing the representations of the first or second time durations as a factor of whether the first time duration is longer or shorter than the second time duration.

25. The computer program product in accordance with claim 24, the operations further comprising:
detecting when the video segment or the first video clip stops playing; and
triggering the selection of the second video clip to present in the video segment user interface.

26. The computer program product in accordance with claim 25, the operations further comprising:
prior to receiving the selection of the second video clip,
detecting an initiation to play the video segment or the first video clip;
presenting the video segment or the first video clip in the video segment user interface element; and
presenting a representation of the first time duration of the video segment in the timeline.

27. A method comprising:
obtaining video data comprising a plurality of video clips;
presenting the video data in a user interface comprising a video display element configured to play video from the video data, a clip selection element configured to receive selections of the video clips, and a timeline element configured to present both chronological and durational information about a first video clip on a defined time scale;
receiving a selection for a second video clip from one of the video clips through the clip selection element;
adjusting, in response to the selection, the defined time scale in the timeline element based on durational information of the second video clip; and
presenting the adjusted defined time scale corresponding to the durational information of the second video clip in the timeline element by animating the adjusting of the defined time scale in the timeline element.

28. The method in accordance with claim 27,
wherein the animating of the adjusting of the defined time scale comprises animating by stretching or compressing representations of time durations of the first or second video clips as a factor of whether the first video clip has a longer duration or a shorter duration than the second video clip.

29. The method in accordance with claim 27, wherein the selection of one of the video clips comprises:
detecting when video data in the user interface stops playing; and
selecting a most recently-played video clip for the adjusting of the defined time scale.

30. The method in accordance with claim 27, wherein the selection of the second video clip comprises a selection from a video clip user interface element configured to present a chronological representation of video clips in the video data.

31. A computer program product, encoded on a computer-readable medium, operable to cause data processing apparatus to perform operations comprising:
  obtaining video data comprising a video segment, the video segment comprising a plurality of video clips;
  presenting the video data in a user interface comprising a video display element configured to play video from the video data, a clip selection element configured to receive selections of the video clips, and a timeline element configured to present both chronological and durational information for a first video clip or the video segment on a defined time scale;
  receiving a selection for a second video clip from one of the plurality of video clips through the clip selection element;
  adjusting, in response to the selection, the defined time scale in the timeline element based on durational information of the second video clip; and
  presenting the adjusted defined time scale corresponding to the durational information of the second video clip in the timeline element by animating the adjusting of the defined time scale in the timeline element.

32. The computer program product in accordance with claim 31, wherein the operations for the animating of the adjusting of the defined time scale comprises operations for animating by stretching or compressing representations of time durations of the first or second video clips as a factor of whether the first video clip has a longer duration or a shorter duration than the second video clip.

33. The computer program product in accordance with claim 31, wherein the selection of one of the plurality of video clips comprises a selection from a video clip user interface element configured to present a chronological representation of video clips in the video data.

34. The computer program product in accordance with claim 31, wherein the selection for a second video clip comprises:
  detecting when video data in the user interface stops playing; and
  selecting a most recently-played video clip for the second video clip.

35. The computer program product in accordance with claim 34, the operations further comprising:
  detecting an initiation to play the video data;
  presenting the video data in the video display element; and
  presenting the durational information for the video data in the timeline element.

36. The computer program product in accordance with claim 31, the operations further comprising presenting a chronological representation of the plurality of video clips that are chronologically adjacent to the one of the video clips selected.

37. A method comprising:
  presenting a video segment or a first video clip of the video segment in a video segment user interface element, wherein the video segment comprises one of a plurality of video clips, wherein the video segment user interface element is configured to play the video segment or one of the plurality of video clips from the video segment;
  presenting a first representation of a first time duration in a timeline corresponding to the video segment or the first video clip;
  receiving a selection of a second video clip from the plurality of video clips to present in the video segment user interface element;
  replacing the first representation of the first time duration in the timeline with a second representation of a second time duration corresponding to the second video clip, wherein the replacing comprises adjusting the first representation to the second time duration in a defined time scale in the timeline;
  presenting the second representation associated with the second video clip in the timeline by animating the adjusting of the first representation to the second time duration; and
  presenting the second video clip in the video segment user interface element.

38. The method in accordance with claim 37, further comprising:
  presenting a chronological representation of a plurality of video clips that are chronologically adjacent to the video clip.

39. The method in accordance with claim 38, wherein the presenting the chronological representation of the plurality of video clips comprises presenting the chronological representation of the plurality of video clips that are chronologically adjacent to the video clip when the video clip is selected for presentation in the video segment user interface element.

40. The method in accordance with claim 37, wherein the animating of the adjusting of the first representation to the second time duration comprises operations for providing the animation by stretching or compressing the representations of the first or second time durations as a factor of whether the first time duration is longer or shorter than the second time duration.

41. The method in accordance with claim 40, further comprising:
  detecting when the video segment or the first video clip stops playing; and
  triggering the selection of the second video clip to present in the video segment user interface.

42. The method in accordance with claim 41, further comprising: prior to receiving the selection of the second video clip,
  detecting an initiation to play the video segment or the first video clip;
  presenting the video segment or the first video clip in the video segment user interface element; and
  presenting a representation of the first time duration of the video segment in the timeline.

43. A system comprising:
  a processor to process video;
  a memory to store the video;
  a graphical user interface to present video data, wherein the video data comprises a video segment comprising a plurality of video clips, wherein the graphical user interface comprises a video display element configured to play video from the video data, a clip selection element configured to receive selections of the video clips, and a timeline element configured to present both chronological and durational information for a first video clip or the video segment on a defined time scale;
  wherein the clip selection element is configured to receive a selection for a second video clip from one of the plurality of video clips,
  wherein the timeline element is configured to adjust, in response to the selection, the defined time scale based on durational information of the second video clip, and
  wherein the graphical user interface is configured to present the adjusted defined time scale corresponding to the durational information of the second video clip in the timeline element by animating the adjusting of the defined time scale.

44. The system in accordance with claim 43, wherein the graphical user interface is configured to present animation in the timeline element to indicate the adjusting of the defined time scale by stretching or compressing representations of time durations of the first or second video clips as a factor of whether the first video clip has a longer duration or a shorter duration than the second video clip.

45. The system in accordance with claim 43, wherein the video clip user interface element is configured to present a chronological representation of video clips in the video data.

46. The system in accordance with claim 43, wherein the system is configured to detect when video data in the user interface stops playing and select a most recently-played video clip for the second video clip.

47. The system in accordance with claim 46, wherein the system is configured to detect an initiation to play the video data, present the video data in the video display element, and present the durational information for the video data in the timeline element.

48. The system in accordance with claim 43, wherein the system is configured to present a chronological representation of the plurality of video clips that are chronologically adjacent to the one of the video clips selected.

49. A system comprising:
a processor to process video;
a memory to store the video;
a graphical user interface comprising a video segment user interface element, wherein the graphical user interface is configured to:
present a video segment or a first video clip of the video segment in the video segment user interface element, wherein the video segment comprises one of a plurality of video clips, wherein the video segment user interface element is configured to play the video segment or one of the plurality of video clips from the video segment;
present a first representation of a first time duration in a timeline corresponding to the video segment or the first video clip;
receive a selection of a second video clip from the plurality of video clips to present in the video segment user interface element;
replace the first representation of the first time duration in the timeline with a second representation of a second time duration corresponding to the second video clip, wherein the replacing comprises adjusting the first representation to the second time duration in a defined time scale in the timeline;
present the second representation associated with the second video clip in the timeline by animating the adjusting of the first representation to the second time duration; and
present the second video clip in the video segment user interface element.

50. The system in accordance with claim 49, wherein the system is configured to present a chronological representation of a plurality of video clips that are chronologically adjacent to the video clip.

51. The system in accordance with claim 50, wherein the system is configured to present the chronological representation of the plurality of video clips that are chronologically adjacent to the video clip when the video clip is selected for presentation in the video segment user interface element.

52. The system in accordance with claim 49, wherein the system is configured to animate the adjusting of the first representation to the second time duration by stretching or compressing the representations of the first or second time durations as a factor of whether the first time duration is longer or shorter than the second time duration.

53. The system in accordance with claim 52, wherein the system is configured to detect when the video segment or the first video clip stops playing and trigger the selection of the second video clip to present in the video segment user interface.

54. The system in accordance with claim 53, wherein the system is configured to, prior to receiving the selection of the second video clip, detect an initiation to play the video segment or the first video clip, present the video segment or the first video clip in the video segment user interface element, and present a representation of the first time duration of the video segment in the timeline.

* * * * *

UNITED STATES PATENT AND TRADEMARK OFFICE
CERTIFICATE OF CORRECTION

| | | |
|---|---|---|
| PATENT NO. | : 7,877,690 B2 | Page 1 of 1 |
| APPLICATION NO. | : 11/533738 | |
| DATED | : January 25, 2011 | |
| INVENTOR(S) | : Margulis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 21 days.

Signed and Sealed this
Twentieth Day of September, 2011

David J. Kappos
*Director of the United States Patent and Trademark Office*